United States Patent

[11] 3,584,559

| [72] | Inventor | Herman Levin<br>Glenview, Ill. |
|---|---|---|
| [21] | Appl. No. | 779,818 |
| [22] | Filed | Nov. 29, 1968 |
| [45] | Patented | June 15, 1971 |
| [73] | Assignee | Bell & Howell Company<br>Chicago, Ill. |

[54] CONTINUOUS FOCUSING MECHANISM USING TRIANGULATION PRINCIPLE
8 Claims, 5 Drawing Figs.

| [52] | U.S. Cl. | 95/44,<br>352/140 |
|---|---|---|
| [51] | Int. Cl. | G03b 3/00 |
| [50] | Field of Search | 95/44, 44<br>C; 356/9, 15; 352/139, 140 |

[56] References Cited
UNITED STATES PATENTS
2,640,777  6/1953  Fachman.................... 352/139 X Primary Examiner—Samuel S. Matthews
Assistant Examiner—Richard L. Moses
Attorneys—William F. Pinsak and John E. Peele, Jr.

ABSTRACT: A distance determining device operable on the principle of triangulation to focus a camera's objective lens at a focal distance. Adjacent a composing screen for receiving the image of that lens, a focusing screen receives an image from an auxiliary lens. The latter lens is pivotable about an axis perpendicular to the optical axis so as to enable alignment of the base of a subject with a reference mark on the focusing screen and through a coupling to focus simultaneously the objective lens on that subject.

PATENTED JUN 15 1971 3,584,559

Inventor:
Herman Levin
By John E. Peele Jr. Attys.

CONTINUOUS FOCUSING MECHANISM USING TRIANGULATION PRINCIPLE

The present invention relates to an improvement in a focusing mechanism for a motion picture camera having an objective lens which is adjustable according to focal distances which are determined by triangulation. Particularly, the invention relates to an image aligning system wherein the image is adjusted relative to a reference mark in a viewing system by an auxiliary lens system coupled for simultaneous adjustment of the objective lens.

The triangulation principle relates to the determination of the length of one side of a right triangle, herein the camera-to-subject of focal distance. To compute this distance, either height of the vertical side or length of the hypotenuse of the triangle, and one of the angles other than the right angle must be known. For use of the principle in a camera focusing arrangement, the length of the vertical side of the triangle may be empirically determined as the "height of an average adult" above a supporting plane on which the user stands. Thus, the vertical side will be approximately the same in most uses to which a camera is put. To determine one of the variable angles of the triangle, the user can view the subject at a point where a vertical line through the subject intersects the supporting plane. Since the varying angular relation may be used to determine the length of the baseline, this information may be converted mechanically into focal distance for adjustment of the objective lens for that distance.

Rangefinder devices using the principle of triangulation for determining the focal distance between a camera and a subject are known. Most of these rangefinders have been of the short base type in which the angle defining component is within a few inches of the reference baseline relative to which the angle is determined. The short base is required to enable fitting the mechanism within the available space in the camera housing. Because of the size limitations, extremely accurate and relatively complex mechanical and optical components have been required for assembly into these rangefinders. Because of this accuracy and complexity, the resulting cost of these rangefinder devices have often added significantly to the cost of the camera incorporating the device.

Rangefinder systems including a pendulous member mounted for orientation by gravity to correlate the angle have been proposed. Although these devices have been satisfactory for the determination of focal distance, they have required that the user temporarily stop filming in order to check the focal distance. In these devices, the lens of the camera or other optical instrument must be temporarily oriented so as to align the base of the remote subject with a reference mark in the viewfinder of that camera. While this step is being performed, the user is required to ignore the general scene.

The present invention provides a rangefinder system eliminating the need for mathematical computation by the user to determine the focal distance, and provides a device permitting continuous changing of focal distance of the camera's objective lens if the subject is moved with respect to the user. The changing of the lens focal distance may be done with accuracy, whether or not the camera is being run, in that the main scene as previously composed is not interrupted. That is, to ascertain the variable angle of the right triangle, a secondary lens, which forms an image on a focusing screen adjacent the primary composing screen, is readily adjustable. Adjustment of this lens may be performed by actuation of a handle portion arranged for movement about an axis perpendicular to the optical axis of the objective lens. A coupling device connects the objective lens and the auxiliary lens for simultaneous adjustment and for translation of the angle to which the auxiliary lens is adjusted into focal distance adjustment of the objective lens. Thus, it can be seen that to focus the objective lens of a camera incorporating this system, the user need only view the base of a subject momentarily so as to align the image of the base relative a reference mark in the auxiliary viewing screen without angling or otherwise disturbing the camera's position insofar as the primary objective lens is concerned.

Thus, an object of the present invention is to provide a novel distance determining mechanism using the principle of triangulation.

Another object of the invention is to provide a range-finding device operable continuously whether or not the camera is being run.

Yet another object of the invention is to provide a rangefinding device in which the focusing image is provided by a simple lens system mounted for movement about an axis extending perpendicular to the camera's optical axis.

Further and other objects will be apparent from the description of the accompanying in which like numerals refer to like parts.

Figure 1:
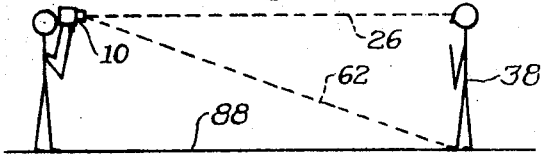
FIG. 1 is a schematic view of the principle of triangulation with a camera in focal distance determining orientation.

Referring to the figures, there is shown an optical instrument such as a motion picture camera 10 with a housing having conventional wall portions including front wall 14 and rear wall 16. Focusable objective lens assembly 20 is supported in and may extend from front wall 14. This assembly includes lens barrel 22 in which objective lens 24 is positioned concentrically to define optical axis 26 fixed relative to the housing. Objective lens 24 includes focusing lens element 28 supported in sleeve 30 carried for axial adjustment within barrel 22. Adjustment of sleeve 30 and element 28 adjusts the focal plane of objective lens 24 into coincidence with an image or film plane 32 within housing 10. That is, objective lens 24 is adjustable for a range of focal distances corresponding to subject-to-camera distances.

Objective lens 24 forms on image plane 32 an image of remote subject 38 as seen in FIG. 1. By an image pickoff member, such as mirror 40, and reflecting member 42, the lens forms a corresponding image in a viewfinder system including elements 44. The latter image is visible to a user on composing screen 46 through port or opening 48 in housing rear wall 16.

Figure 2:
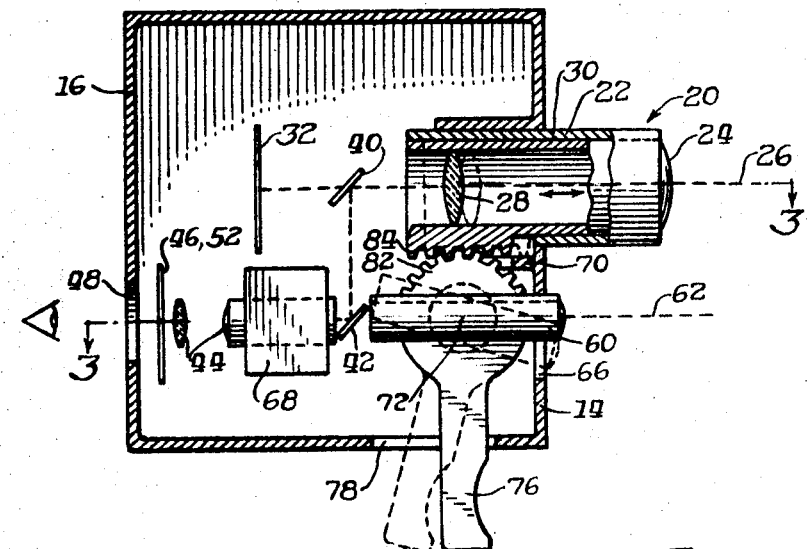
FIG. 2 is a schematic view of an optical instrument incorporating the rangefinding device of this invention, with parts broken away and parts removed for clarity.
Figure 3:
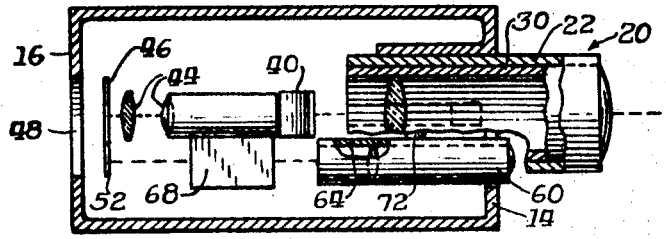
FIG. 3 is a plan view in partial section taken along line 3–3 of FIG. 2.
Figure 4:
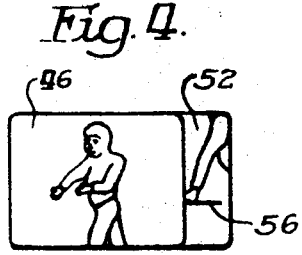
FIG. 4 is a view of a preferred embodiment of a composing and focusing screen.
Figure 5:
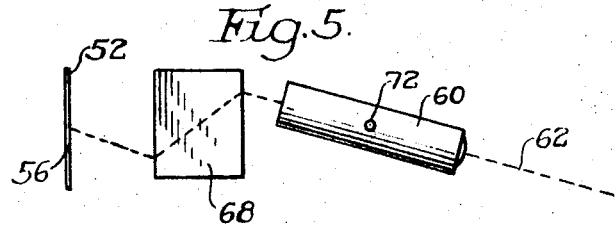
FIG. 5 is a schematic diagram of the auxiliary lens system and associated optics with the lens system adjusted for a near subject.

Adjacent main or composing viewfinder screen 46 is auxiliary or focusing screen 52 also visible through port 48 of housing rear wall 16. Arranges to be visible on focusing screen 52 is reference mark 56 relative to which at least a partial image of the subject may be positioned for determining the focal distance to which lens 24 should be adjusted to focus on the subject. Auxiliary lens system 60 (FIGS. 2, 3 and 5) forms the partial or secondary image on focusing screen 52, and defines secondary optical axis 62. The auxiliary lens system includes barrel 64 for mounting the lens either through or adjacent to an image access opening 66 in housing front wall 14. The lens is pivotable between a horizontal position with its axis 62 parallel with primary optical axis 26, and an inclined position with its axis 62 aimed at the base of subject 38. To maintain the image from auxiliary lens 60 on focusing screen 52 when the lens optical axis is at its maximum angle relative optical axis 26, prism such as plastic cube 68 is positioned in the optical path to translate the position of the image vertically. As seen FIG. 5, optical axis 62 is maintained centrally of focusing screen 52.

Angular adjustment of auxiliary lens 60 throughout its range causes primary objective lens 24 to be adjusted axially of optical axis 26 to corresponding focal distances through a coupling, designated generally 70. Auxiliary lens 60 is positionable angularly about an axis, shown as stub shaft 72, by control member 76. In this preferred embodiment, the control member is a triggerlike member, extending through slot 78 in camera housing 10 for manual engagement. Coupling 70 is exemplified as gear sector 82 forming an upper portion of control member 76, which sector meshes with rack portion 84 integral with sleeve 30 of objective lens assembly 20 to adjust the focal plane of the latter when control member 76 is pivoted about axis 72. Hence, pivotal or rocking movement of control member 76 is translated into reciprocating axial movement of focusing lens element 28 through coupling 70.

Focusing operation for an optical instrument incorporating the present invention may be performed at any time the user desires since main viewfinder screen 46 continuously exhibits an image of the object to be photographed. The user need only actuate control member 76 to align the base of the subject with reference mark 56 in auxiliary viewing screen 52 to correct the focus, should the subject or the user move from its or his previous position. By the principle of triangulation, and through coupling 70, main objective lens 24 is adjusted into focus on the subject without further or independent manipulation by the user. Quite obviously, when distant scenery alone is being photographed, the user merely moves control member 76 fully forward to an infinity position and for all practical purposes, may ignore auxiliary screen 52. From the description of the foregoing embodiment of the invention, it will be seen that a focusing mechanism for a camera is provided wherein a user views subject 38 through the viewfinder system of camera housing 10. Primary objective lens 24 images the subject on composing screen 46 along a substantially horizontal line defined by optical axis 26. Simultaneously, the user can adjust control member 76 to align the base of the image of subject 38 with reference line 56 to cause secondary optical axis 62 to generate a hypotenuse of a right triangle. Because both the user and the subject are supported on substantially the same surface, that surface may be considered to define baseline 88 of the right triangle.

Determination of the length of baseline 88 determines the focal distance to which main lens 24 should be adjusted. By mathematical computation, the angle of inclination of the hypotenuse for a given focal distance may be empirically computed, and by coupling 70 can be mechanically translated into lens adjustment. Reference mark 56, provided in focusing screen 52, is positioned for alignment at the base of an image of a subject at a distance approximating infinity, wherein optical axes 26 and 62 are parallel. When a subject is located at nearer distances, optical axis 62 is angled into alignment with the base of the subject. That is, axis 62 intersects a vertical through the subject at its junction with baseline 88. Thus, primary objective lens 24 is focused at a focal distance corresponding to the horizontal distance between the camera and the subject.

The foregoing description is illustrative of one way of accomplishing the invention, and many variations and alterations will be obvious to those skilled in the art. For example, alternative embodiments of the control member for adjusting the auxiliary lens may consist of pushbuttons or a slidable button linked to the coupling. Likewise, the coupling may take many forms, such as frictionally engageable members or cooperating slides oriented to generate the required relative movements.

I claim:

1. In an optical instrument having a housing, a focusable objective lens arranged on said housing for focusing adjustment relative to a remote object, and a viewfinder system, the combination comprising:

means forming a scene image in the viewfinder system corresponding to the scene image formed by the objective lens;

an auxiliary viewfinder screen including a reference mark;

auxiliary lens means forming on said auxiliary screen at least a part of said scene image, said auxiliary lens means being pivotable through an acute angle about an axis perpendicular to an optical axis defined by the objective lens;

means for adjusting said auxiliary lens means for positioning of the base of an object image in said partial scene relative to said reference mark; and means coupling said auxiliary lens means and said objective lens for focusing the scene image by said latter lens upon adjusting said auxiliary lens means.

2. The combination as claimed in claim 1, wherein said means for adjusting said auxiliary lens means is manually operable from outside of said instrument housing.

3. The combination as claimed in claim 1, wherein said coupling means includes gearing on said means for adjusting said auxiliary lens means and cooperating gearing on said focusable objective lens whereby adjustment of one of said lens means is transmitted to adjust simultaneously said other lens means.

4. The combination as claimed in claim 1, wherein said coupling means for adjusting said auxiliary lens means comprises a material frictionally engageable with material on said focusable objective lens whereby adjustment of one of said lens means is transmitted to adjust simultaneously said other lens means.

5. The combination as claimed in claim 3, wherein said auxiliary lens means is mounted on said housing for pivotable movement; and including means movable about an axis to pivot said auxiliary lens means.

6. The combination as claimed in claim 5, wherein said auxiliary lens means is arranged for focusing of said objective lens means at infinity when the optical axis of said auxiliary lens means is parallel with the optical axis defined by said objective lens means.

7. In an optical instrument having a housing and a focusable objective lens arranged on said housing for focusing adjustment, and a primary viewfinder system, the combination comprising:

an auxiliary viewfinder screen associated with and exclusive of the primary viewfinder system;

an auxiliary lens means forming on the auxiliary viewfinder screen a partial image of the subject image formed by the focusable objective lens on the screen of the primary viewfinder system;

means exterior of said housing coupled with said auxiliary lens means for pivoting said lens means from a first condition parallel with said objective lens to a second condition inclined relative to said objective lens;

coupling means on said pivoting means for driving said objective lens as said pivoting means is driven manually; and a reference mark associated with and visible on said auxiliary viewfinder screen relative to which a subject image on said screen is alignable whereby a subject formed by said objective lens is focused on said primary viewfinder screen when said partial subject image is aligned with said reference mark.

8. In an optical instrument having a housing, a focusable objective lens arranged on said housing for focusing adjustment relative to a remote object, and a viewfinder system, the combination comprising:

means forming a scene image in the viewfinder system corresponding to the scene image formed by the objective lens;

a reference mark formed on a scene imaging screen;

means for adjusting the image forming means to adjust the base of an object image relative to said reference mark; and means coupling image forming means and said objective lens for focusing the scene image by said objective lens upon adjusting the image forming means.